(No Model.)

J. SHARPLES, Jr.
JOINT AND NOZZLE FOR HOSE.

No. 395,009. Patented Dec. 25, 1888.

WITNESSES.
Geo A Mumford
Joseph H Paine

INVENTOR
Joseph Sharples, Jr.
By his Attorney,
Thos P Barnefield

UNITED STATES PATENT OFFICE.

JOSEPH SHARPLES, JR., OF PAWTUCKET, RHODE ISLAND.

JOINT AND NOZZLE FOR HOSE.

SPECIFICATION forming part of Letters Patent No. 395,009, dated December 25, 1888.

Application filed May 19, 1887. Serial No. 238,726. (No model.)

*To all whom it may concern:*

Be it known that I, JOSEPH SHARPLES, Jr., a citizen of the United States, residing at Pawtucket, in the county of Providence and State of Rhode Island, have invented a new and useful Improvement in Joints and Nozzles for Hose, of which the following is a specification.

My said invention relates to joints and nozzles for hose; and it consists of a slightly-tapering cylinder whose end is provided with an inward-projecting scarf, as hereinafter described.

The accompanying drawings are hereby made part of this specification, similar letters of reference thereon indicating corresponding parts.

Figure 1:
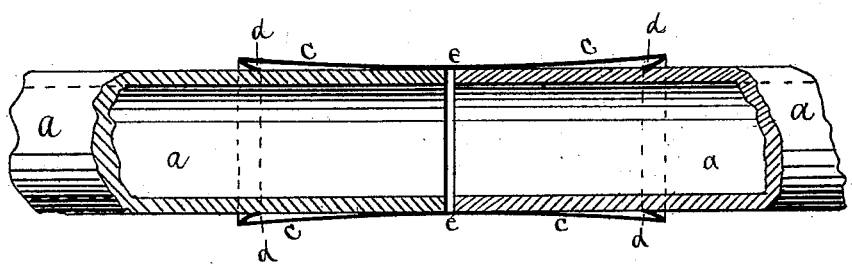
Figure 2:
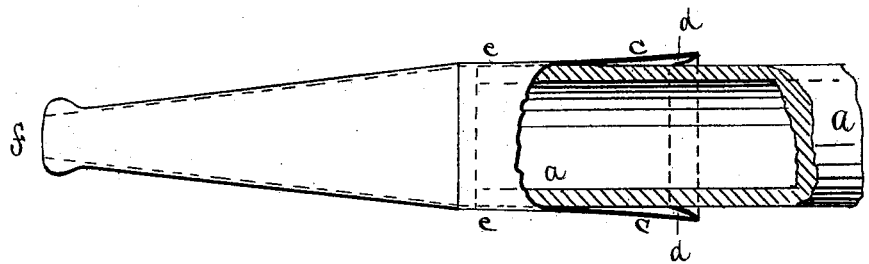
Figure 3:
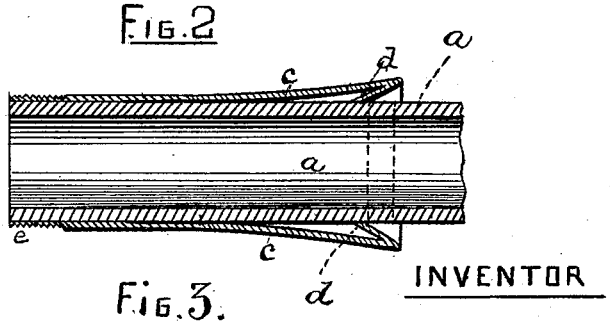

Figure 1 of said drawings shows two pieces of hose joined together at their ends by my said device when used instead of the usual coupling, parts of said pieces of hose being torn away to show the relations of each to the other. Fig. 2 shows my said invention attached to the end of the hose and used as a nozzle, part of the hose being shown in section to illustrate the manner of holding it in said nozzle. Fig. 3 is a longitudinal section of my invention attached to the end of a hose and screw-threaded for the reception of an ordinary nozzle.

*a a* represent the hose; *c c*, the walls or sides of the tapering cylinder; and *d d* show the inward-projecting scarf soldered to or formed upon the larger end of said cylinder.
The construction and use of my said device will be apparent from the drawings, as above explained. It will be seen that said device is adapted to be used both as a means for joining together two pieces of hose, as is frequently necessary to repair lengths that burst in their using, and as a nozzle to be attached to the end of the hose, in both of which cases I do away with all coupling devices whatsoever. When made to be used as a joint, as aforesaid, I slightly taper the cylinder from each end to the center, so that said cylinder shall be smallest at the point *e* when the ends of the hose meet therein, and the pieces forming the inward-projecting scarf *d d*, I use at both of said cylinder ends. When made to be used as a nozzle, the larger end to receive the end of the hose will be made in the same manner and the part *e* of said cylinder will be threaded, as seen in Fig. 3, to permit the usual nozzle to be screwed thereon, or the device may be abruptly tapered from said part *e* to make a nose thereon, as shown at *f* in Fig. 2.

My said device may be cast or otherwise worked from metal or other suitable material, and the inward-projecting scarf *d d* may be cast with or worked from the same piece or from a separate piece of stock properly formed therefor and soldered to the end of the cylinder. I find that the taper given to said cylinder, as above described, causes a suction at the smallest diameter when the hose is used, and thereby the tendency is to retain the hose in the cylinder; but if from inward pressure or other causes the tendency should be to push the end of the hose backward and out from said cylinder the said inward-projecting scarf *d d* clutches the surface of the hose and will not suffer it to retreat; and from the relation of said part *d d* to the cylinder, as shown in the drawings, it will be seen that the projecting rim of this circular scarf will have a certain elasticity when the end of the hose is being inserted therein, but will be a very formidable resistant when the hose is pushed the other way.

The simplicity and usefulness of my said device and the ease and rapidity with which every one can apply it to any hose will be apparent from this specification.

What I claim as new, and desire to secure by Letters Patent, is—

1. A joint for hose, consisting of a tapering cylinder provided at the end, on the inner side, with a rearwardly-inclined elastic lip or scarf, substantially as described, and for the purposes set forth.

2. A joint for hose, consisting of a tapering cylinder provided at one end, on the inner side, with a rearwardly-inclined elastic lip or scarf, the said joint being formed integral with a nozzle, substantially as described.

JOSEPH SHARPLES, JR.

Witnesses:
THOS. P. BARNEFIELD,
JOSEPH H. PAINE.